May 22, 1934.   A. Y. DODGE   1,959,349
TRANSMISSION
Filed March 28, 1931   2 Sheets-Sheet 1
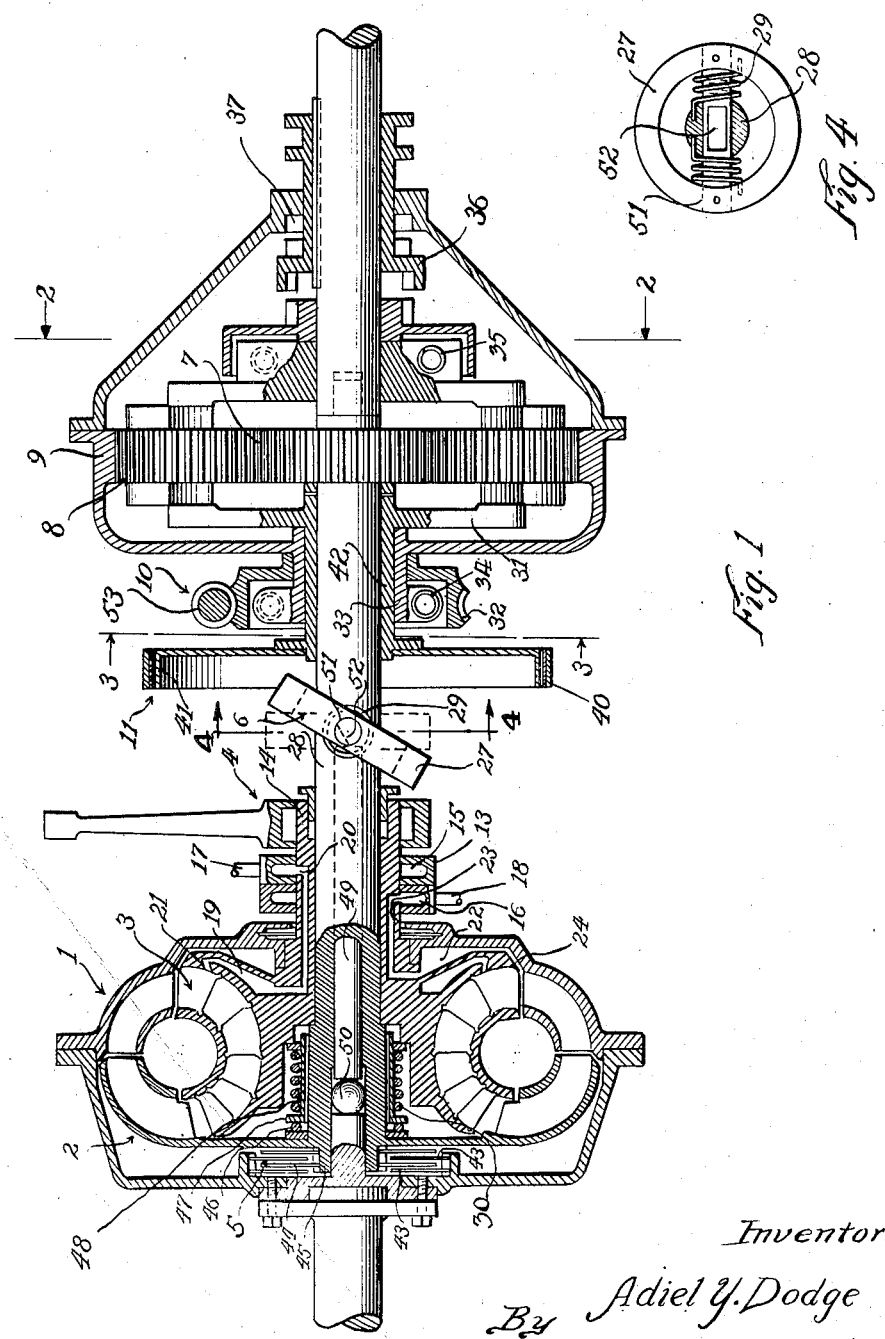
Inventor:
Adiel Y. Dodge
By James Addington Ames Siebold
Attorneys.

May 22, 1934.     A. Y. DODGE     1,959,349
TRANSMISSION
Filed March 28, 1931     2 Sheets-Sheet 2
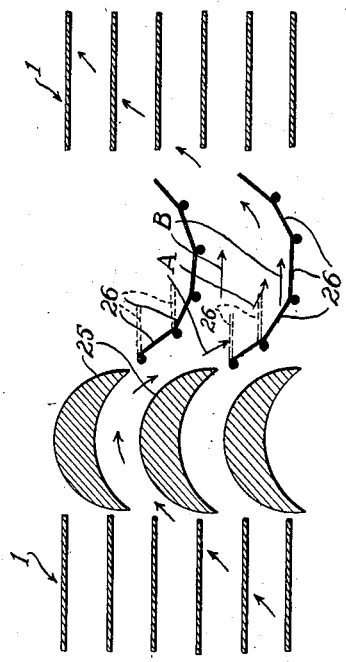
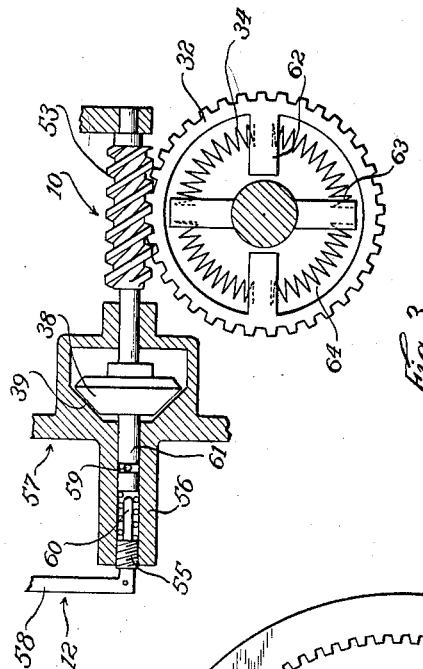
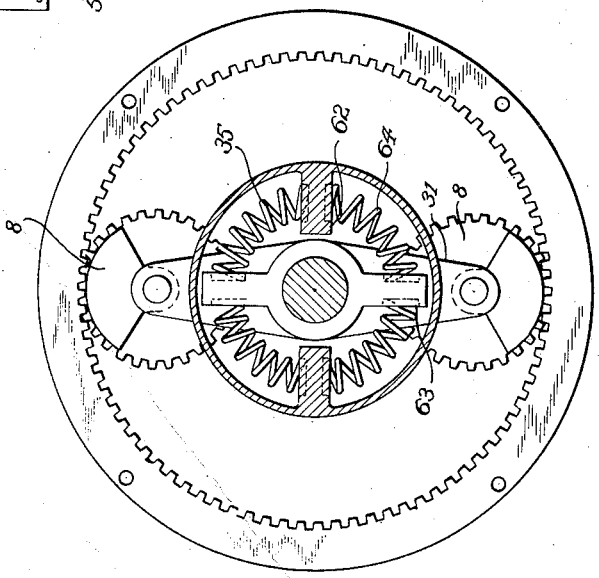
Inventor:
Adiel Y. Dodge
By Jones Addington Ames & Seibold
Attorneys.

Patented May 22, 1934

1,959,349

UNITED STATES PATENT OFFICE 1,959,349

TRANSMISSION

Adiel Y. Dodge, South Bend, Ind.

Application March 28, 1931, Serial No. 525,968

14 Claims. (Cl. 74—34)

My invention relates to transmissions.

One of the objects of my invention is to provide an improved transmission in which use is made of a hydraulic stage and a mechanical stage which will give smooth pick-up and increased torque, and which will be simple and efficient in operation.

A further object is to provide such a construction in which provision is made for securing reverse.

Further objects will appear from the description and claims.

In the drawings, in which an embodiment of my invention is shown,

Figure 1 is an axial section through the transmission;

Fig. 2 is a section on the line 2—2 of Figure 1;

Fig. 3 is a section on the line 3—3 of Fig. 1;

Fig. 4 is a section substantially on the line 4—4 of Fig. 1; and

Fig. 5 is a diagrammatic view showing the liquid circulation.

Referring to the drawings in detail, the transmission shown comprises a liquid-propelling rotor 1, a liquid-propelled rotor 2, to which liquid is delivered from the propelling rotor, a circular liquid directing reactance member 3 for directing liquid from the propelled rotor back to the propelling rotor, a one-way reactance device 4 permitting rotation of the reactance member 3 in the direction of the propelling rotor but preventing reverse rotation, clutch means 5 for connecting and disconnecting the propelled rotor with respect to the propelling rotor, centrifugal force means 6 controlling said clutch, a sun gear 7 driven by the propelled rotor, eccentrically weighted planetary gearing 8 meshing with said sun gear, a driven gear 9 meshing with said planetary gearing, a one-way reactance device 10 permitting rotation of the driven gear 9 in one direction but normally preventing reverse rotation, means 11 for holding the planetary gearing against rotation about the sun gear when desired to effect reverse rotation of the driven gear, and means 12 for rendering the one-way reactance device ineffective when the planetary gearing is held to permit the reverse rotation of the driven gear.

In order to provide for expansion of the liquid (which may be oil or any other suitable liquid), a small external reservoir (not shown) is provided which is connected with the circulatory system of the transmission. This connection with the circulatory system is effected by means of an annular header 13 surrounding the sleeve 14 on which the circular reactance member 3 is mounted, this annular header being provided with a pair of annular channels 15 and 16 connected with the pipes 17 and 18 respectively, leading to the reservoir.

The annular channel 15 of the header is in communication with the flow through the reactance member 3 by means of a tortuous passage 19 leading from a port 20 in communication with the annular channel 15 to a port 21 in communication with the flow through the reactance member. The annular channel 16 is in communication with the space between the annular reactance member 3 and the liquid-propelling rotor 1 by means of a tortuous passage 22 leading from a port 23 in communication with the annular channel 16 to a port 24 in communication with the space between the liquid propelling rotor 1 and the circular reactance member 3.

As indicated in Fig. 5, the liquid-propelling rotor is, in effect, a centrifugal pump delivering liquid to the blades 25 of the propelled rotor which is thereby caused to rotate. The liquid returns to the propelling rotor by way of the passages between the pivoted blades 26 of the circular reactance member. These blades 26 overlap each other in such a manner that they accommodate themselves to the direction of flow of the liquid, but due to their overlapping relation they cannot swing below the full-line positions shown in Fig. 5. When the propelling rotor 1 is rotating and the propelled rotor 2 is stationary (owing to excessive load), the liquid follows the path shown by the arrows A. If, however, the propelled rotor is moving, the liquid, as it leaves the blades of this propeller, will have a velocity component in the direction of rotation of the propelled rotor so that the liquid may leave the blades of the propelled rotor in the direction shown by the arrows B and in this case the pivoted blades 26 will assume the positions shown in dotted lines in line with the direction of flow. The remaining blades will, of course, remain as they are and deflect the liquid back into the propelling rotor 1.

Thus, as the load on the propelled rotor varies, its speed also varies and, in consequence, the liquid leaves the blades of the propelled rotors at varying angles. No matter at what angle the liquid leaves the propelled rotor, the pivoted blades adjust themselves to this direction of flow immediately. It follows that at all speeds the fluid is returned to the propelling rotor at the angle giving the greatest efficiency, which prevents loss of energy and gives an increased torque to the propelled rotor.

As the speed of the propelled rotor increases, the ring 27, rockably mounted on the shaft 28 of the propelled rotor 2, due to centrifugal force, tends to move to the dotted-line position shown in Fig. 1 against the action of the torsion spring 29, thus allowing the propelled rotor 2 to slip to the left under the action of the coil compression spring 30, eventually causing the propelled rotor 2 to rotate at the same speed as that of the propelling rotor 1, through the action of the friction disc clutch 5.

As the speed of the propelled rotor 2 is working up to the speed of the propelling rotor 1, the reactance member will also begin to rotate 3, due to the action of the liquid in the circulatory system, this rotation being permitted by the one-way reactance clutch 4. A condition will eventually be reached in which the annular reactance member 3 will rotate at the same speed as the liquid propelling rotor and the propelled rotor, the entire construction then rotating as a unit with no fluid circulation.

The sun gear 17 mounted on the shaft 28 of the propelled rotor will first cause a reduced speed forward rotation of the gear carrier 31 which carries the planetary gearing 8, since the ring gear 9 is held against reverse rotation by means of the one-way reactance device 10 shown in Fig. 3, which acts on a worm gear 32, which drives to the hub 33 of the ring gear 9. However, the eccentrically weighted planetary gears 8 exert alternating impulses on the ring gear 9 and as the reverse impulses are killed off by the reactance device, permitting only forward impulses to be effective, the ring gear 9 will soon begin to rotate in the direction of the planetary gear carrier. The effect of these one-way impulses will increase and if the load is not too great, a condition will soon be reached in which the ring gear will be rotating at the same speed as the planetary gear carrier 31 and the entire transmission will then revolve as a unit without any substantial relative motion between the parts. In order to smooth out the impulses, I may provide a cushioning transmission 34 between the worm gear and the hub of the ring gear, as shown in Fig. 3, and another yielding transmission 35 between the planetary gear carrier and the driving member of a clutch, as shown in Fig. 2.

For reverse, the driven clutch member 36 may be shifted to the right, as viewed in Fig. 1, to connect this driven clutch member with the ring gear hub 37. The control lever 12 for the reactance device 10 will then be shifted to move the friction disc or cone 38 out of engagement with the cooperating friction surface 39, thus nullifying the action of this reactance device and permitting reverse rotation of the ring gear 9. At the same time, the planetary gear carrier 31 will be held against rotation by the gripping action of the friction band 40 acting on a friction drum 41 secured to the hub 42 of the planetary gear carrier. Under these conditions, the ring gear 9 will be driven in a reverse direction following the well-known laws of planetary gearing.

It will thus be seen that I have provided a variable speed transmission which will have a very smooth pick-up and which provides for two stages of torque increase and in which a one-to-one transmission can be obtained in which there is no relative motion between the parts of the transmission (except that due to the flexible couplings used for smoothing up the action and lessening vibration).

I will now describe in more detail certain parts of the transmission, including the clutch 5 and related parts, the reactance device construction shown in Fig. 3, and the cushioning transmissions 34 and 35 shown in Figs. 2 and 3.

Referring first to the clutch construction 5, this comprises a set of friction discs 43 having a splined connection with the rotor 1, a second set of cooperating friction discs 44 splined on the hub 45 of the rotor 2, the coil compression spring 30 tending to hold the two sets of friction discs in engagement, an anti-friction bearing 46 between the flange 47 of the spring support 48 and the rotor 2, a thrust pin 49 slidably mounted in the hollow shaft 28, an anti-friction bearing 50 between the end of this thrust pin and the end of the shaft of the rotor 1, and a cam pin 51, oscillatable with the ring 27, and having a flattened cam portion 52 cooperating with the end of the thrust pin 49. In operation, when the shaft 28 is rotating slowly, the torsion spring 29 will hold the ring 27 in the oblique position shown in full lines in Fig. 1, in which the flat spot 52 on the pin 51 is out of engagement with the end of the thrust pin 49, the two sets of friction discs 43 and 44 thus being held out of frictional engagement with each other.

However, when the shaft 28 speeds up, the centrifugal ring 6 moves toward the dotted-line position shown in Fig. 1, bringing the flat spot 52 on the oscillatable pin 51 adjacent or into engagement with the flat end of the thrust pin 49, thus permitting the hollow shaft 28 to move to the left, bringing the two sets of friction discs 43 and 44 into frictional engagement with each other, and eventually causing the rotor 2 to rotate as a unit with the rotor 1.

The one-way reactance device construction shown in Fig. 3 is described more in detail and claimed in my copending application Serial No. 468,786. In a general way, it comprises a worm 53 having a limited amount of axial movement, meshing with and driven by a worm wheel 32 which rotates with the ring gear 9, the friction disc or cone 38 cooperating with the friction surface 39, a plug 55 threaded into the sleeve 56 of the housing 57 and oscillatable back and forth by means of the lever 58, and anti-friction means 59 between the pin 60 extending from the plug 55 and the end of the shaft 61 on which the friction cone 38 and worm 53 are mounted. When the reactance device is functioning, the lever 58 is moved to screw the plug 55 outwardly in the sleeve, moving the pin 60 away from the anti-friction bearing 59 and permitting the friction cone 38 to engage friction surface 39 when the worm gear is moving in a direction to shift the worm 10 to the left. Under these conditions, anti-clockwise rotation of the worm gear 32 is prevented and clockwise rotation of the worm gear 32 is permitted. This nullifies the counter-clockwise impulses due to the weighted planetary gearing 8, but permits the clockwise impulses with the planetary gearing to be effective, thus insuring uni-directional rotation of the ring gear 9.

The cushioning transmissions 34 and 35 are shown as similar in construction. In a general way, each comprises a pair of inwardly extending vanes 62 on the outer rotor and a pair of outwardly extending vanes 63 on the inner rotor, with cushioning devices such as coil compression springs 64 interposed between the two sets of vanes. The effect of these cushioning transmissions is to smooth up the action of the transmission and lessen vibration. A yieldable coupling is provided to absorb and store energy taken from the positive impulses and later expended usefully during moments between positive impulses. If these positive impulses are not properly transmitted, they dissipate themselves in the form of impact or vibrations. Hence a yieldable coupling located between a periodically moving mass and a substantially uniformly moving mass performs a very necessary function to an impulse transmission aside from the elimination of objectionable vibration.

While I have shown and described but one embodiment of the present invention, it will be apparent to those skilled in the art that various modifications thereof may be made without departing from the spirit and scope of this invention, and, therefore, I wish to be limited only by the prior art and the scope of the appended claims.

I claim:

1. A transmission comprising a liquid propelling rotor, a liquid propelled rotor, a reactance rotor for directing liquid from the propelled rotor back to the propelling rotor, a sun gear driven by said propelled rotor, eccentrically weighted planetary gearing meshing with said sun gear, a driven gear meshing with said planetary gearing, a one-way reactance device permitting rotation of the driven gear in one direction but preventing reverse rotation, means for holding the planetary gearing against rotation about the sun gear when desired to effect reverse rotation of the driven gear, and means for rendering said one-way reactance device ineffective when the planetary gearing is held.

2. A transmission comprising a liquid propelling rotor, a liquid propelled rotor, a reactance rotor for directing liquid from the propelled rotor back to the propelling rotor, a one-way reactance clutch permitting rotation of the reactance rotor in the direction of the propelling rotor but preventing reverse rotation, a sun gear driven by said propelled rotor, eccentrically weighted planetary gearing meshing with said sun gear, a driven gear meshing with said planetary gearing, a one-way reactance device permitting rotation of the driven gear in one direction but preventing reverse rotation, means for holding the planetary gearing against rotation about the sun gear when desired to effect reverse rotation of the driven gear, and means for rendering said one-way reactance device ineffective when the planetary gearing is held.

3. A transmission comprising a liquid propelling rotor, a liquid propelled rotor, a reactance rotor for directing liquid from the propelled rotor back to the propelling rotor, a one-way reactance clutch permitting rotation of the reactance rotor in the direction of the propelling rotor but preventing reverse rotation, clutch means for connecting and disconnecting the propelled rotor with respect to the propelling rotor, a sun gear driven by said propelled rotor, eccentrically weighted planetary gearing meshing with said sun gear, a driven gear meshing with said planetary gearing, a one-way reactance device permitting rotation of the driven gear in one direction but preventing reverse rotation, means for holding the planetary gearing against rotation about the sun gear when desired to effect reverse rotation of the driven gear, and means for rendering said one-way reactance device ineffective when the planetary gearing is held.

4. A transmission comprising a liquid propelling rotor, a liquid propelled rotor, a reactance rotor for directing liquid from the propelled rotor back to the propelling rotor, a one-way reactance clutch permitting rotation of the reactance rotor in the direction of the propelling rotor but preventing reverse rotation, clutch means for connecting and disconnecting the propelled rotor with respect to the propelling rotor, centrifugal force means controlling said clutch, a sun gear driven by said propelled rotor, eccentrically weighted planetary gearing meshing with said sun gear, a driven gear meshing with said planetary gearing, a one-way reactance device permitting rotation of the driven gear in one direction but preventing reverse rotation, means for holding the planetary gearing against rotation about the sun gear when desired to effect reverse rotation of the driven gear, and means for rendering said one-way reactance device ineffective when the planetary gearing is held.

5. A transmission comprising a fluid propelling rotor enveloping a driven rotor, a stator having self-adjusting angular vanes and a clutch all included in said enveloping rotor and arranged to cause a helical toroidal circulation of fluid, said clutch adapted to connect the rotors, a one-way device outside of said enveloping rotor to hold said stator against reverse rotation and permit the entire assembly to rotate as a unit in the forwardly direction, automatic centrifugal means to actuate said clutch, and communicating means to permit circulation of fluid into and out of the transmission assembly while rotating.

6. A variable speed transmission comprising a fluid torque-increase variable speed transmission mechanism and an alternating impulse transmission mechanism driven by said fluid transmission comprising a rotatable member subject to said alternating impulses and a reactance member preventing reverse rotation of said rotatable member but enabling forward rotation thereof, whereby said rotatable member may be advanced step by step by said impulses.

7. A variable speed transmission comprising a fluid torque-increase variable speed transmission mechanism and an alternating impulse transmission mechanism driven by said fluid transmission comprising a rotatable member subject to said alternating impulses and a reactance member preventing reverse rotation of said rotatable member but enabling forward rotation thereof, whereby said rotatable member may be advanced step by step by said impulses, said fluid transmission mechanism comprising a liquid propelled rotor and said alternating impulse mechanism comprising planet gearing coaxial with said liquid propelled rotor and driven thereby.

8. A variable speed transmission comprising a fluid torque-increase variable speed transmission mechanism and an alternating impulse transmission mechanism driven by said fluid transmission comprising a rotatable member subject to said alternating impulses and a reactance member preventing reverse rotation of said rotatable member but enabling forward rotation thereof, whereby said rotatable member may be advanced step by step by said impulses, said fluid transmission mechanism comprising a liquid propelled rotor and said alternating impulse mechanism comprising counterweighted planet gearing coaxial with said liquid propelled rotor and driven thereby.

9. Power transmitting mechanism comprising a driving and a driven shaft having two transmissions arranged in tandem connecting said shafts and including an impulse type mechanical torque amplifying transmission driving the driven shaft and a fluid type torque amplifying transmission driven by the driving shaft and driving the impulse transmission at all times and automatically compensating in its fluid drive for fluctuations and impulses in the transmission of power between the two transmissions.

10. A transmission comprising a fluid propelling rotor enveloping a propeller rotor, a reactance rotor for directing fluid from the propelled rotor back to the propelling rotor and a clutch, both included in said enveloping rotor, a one-way device outside of said enveloping rotor to hold said reactance rotor against reverse rotation and permit it to rotate in the direction of the propelling rotor, centrifugal means to actuate said clutch to drivingly connect the propelling and propelled rotors, a sun gear driven by the propelled rotor, eccentrically weighted planetary gearing meshing with said sun gear, a driven gear meshing with said planetary gearing, and a one-way reactance device permitting rotation of the driven gear in one direction but preventing reverse rotation.

11. A transmission comprising a fluid propelling rotor enveloping a propelled rotor, a reactance rotor for directing fluid from the propelled rotor back to the propelling rotor and a clutch, both included in said enveloping rotor, a one-way device outside of said enveloping rotor to hold said reactance rotor against reverse rotation and permit it to rotate in the direction of the propelling rotor, centrifugal means to actuate said clutch to drivingly connect the propelling and propelled rotors, a mechanical alternating impulse transmission mechanism, and a connection between said propelled rotor and said transmission mechanism, whereby said mechanism is at all times driven by said propelled rotor.

12. A transmission comprising a fluid propelling rotor enveloping a driven rotor, a stator having angular vanes and a clutch all included in said enveloping rotor and arranged to cause a helical toroidal circulation of fluid, said clutch adapted to connect the rotors, a one-way device outside of said enveloping rotor to hold said stator against reverse rotation and permit the entire assembly to rotate as a unit in the forwardly direction, automatic centrifugal means to actuate said clutch and communicating means to permit circulation of fluid into and out of the transmission assembly while rotating.

13. A transmission comprising a fluid propelling rotor enveloping a driven rotor, a stator having self-adjusting angular vanes and a clutch all included in said enveloping rotor and arranged to cause a helical toroidal circulation of fluid, said clutch adapted to connect the rotors, a one-way device outside of said enveloping rotor to hold said stator against reverse rotation and to permit the entire assembly to rotate as a unit in the forwardly direction and automatic centrifugal means to actuate said clutch.

14. A transmission comprising a fluid propelling rotor enveloping a driven rotor, a stator having angular vanes and a clutch all included in said enveloping rotor and arranged to cause a helical toroidal circulation of fluid, said clutch adapted to connect the rotors, a one-way device outside of said enveloping rotor to hold said stator against reverse rotation and to permit the entire assembly to rotate as a unit in the forwardly direction and automatic centrifugal means to actuate said clutch.

ADIEL Y. DODGE.